United States Patent
Liu et al.

(10) Patent No.: US 9,443,136 B2
(45) Date of Patent: Sep. 13, 2016

(54) APPARATUS AND METHOD FOR DETECTING BODY PARTS FROM USER IMAGE

(71) Applicant: Samsung Electronics Co., Ltd., Suwon-Si, Gyeonggi-Do (KR)

(72) Inventors: Rong Liu, Beijing (CN); Maolin Chen, Beijing (CN); Fan Zhang, Beijing (CN); Ji Yeun Kim, Seoul (KR); Lujin Gong, Beijing (CN); Xun Sun, Beijing (CN); Zhilan Hu, Beijing (CN)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 14/249,464

(22) Filed: Apr. 10, 2014

(65) Prior Publication Data
US 2014/0307955 A1    Oct. 16, 2014

(30) Foreign Application Priority Data

Apr. 12, 2013  (CN) .......................... 2013 1 0126459
Dec. 31, 2013  (KR) ........................ 10-2013-0168788

(51) Int. Cl.
*G06K 9/00*    (2006.01)
*G06K 9/46*    (2006.01)

(52) U.S. Cl.
CPC ......... *G06K 9/00362* (2013.01); *G06K 9/4642* (2013.01)

(58) Field of Classification Search
CPC .................. G06K 9/00362; G06K 9/6256
USPC ................... 382/154, 130–131, 160
See application file for complete search history.

(56) References Cited

U.S. PATENT DOCUMENTS

| | | | |
|---|---|---|---|
| 2011/0025834 A1* | 2/2011 | Chen et al. ..................... 348/77 |
| 2011/0234589 A1 | 9/2011 | Lee et al. |
| 2011/0293180 A1* | 12/2011 | Criminisi et al. ............ 382/173 |
| 2012/0076361 A1* | 3/2012 | Fujiyoshi ..................... 382/103 |

FOREIGN PATENT DOCUMENTS

| | | |
|---|---|---|
| KR | 10080543 | 2/2008 |
| KR | 20090037275 A | 4/2009 |
| KR | 20110020718 A | 3/2011 |

OTHER PUBLICATIONS

Carbini et al., Tracking Body Parts of Multiple People for Multi-Person Multimodal Interface, France Telecom, R&D.
Haubner et al., Towards a Top-View Detection of Body Parts in an Interactive Tabletop Environment, Design Computer Science Media, RheinMain University of Applied Sciences.

* cited by examiner

*Primary Examiner* — Ruiping Li
(74) *Attorney, Agent, or Firm* — Harness, Dickey & Pierce, P.L.C.

(57) ABSTRACT

An apparatus for detecting a body part from a user image may include an image acquirer to acquire a depth image, an extractor to extract the user image from a foreground of the acquired depth image, and a body part detector to detect the body part from the user image, using a classifier trained based on at least one of a single-user image sample and a multi-user image sample. The single-user image may be an image representing non-overlapping users, and the multi-user image may be an image representing overlapping users.

11 Claims, 10 Drawing Sheets

210  220  230

310  320  330

FIG. 6
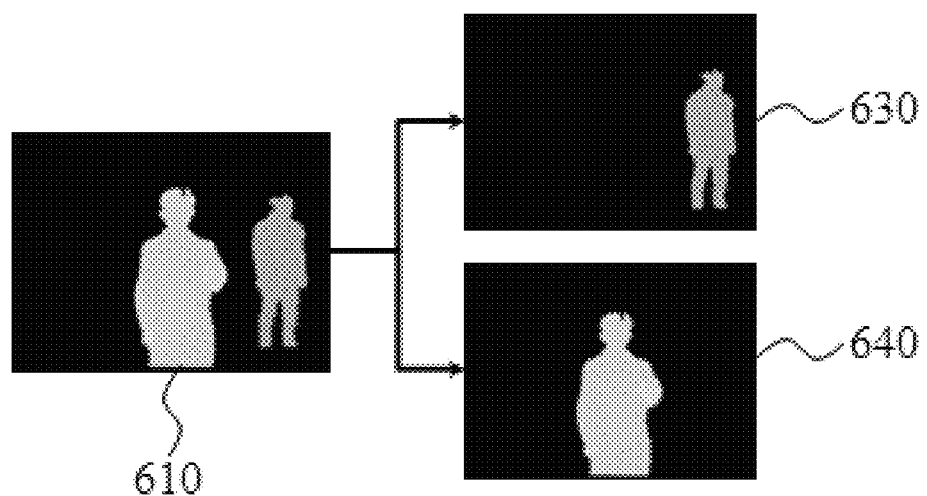
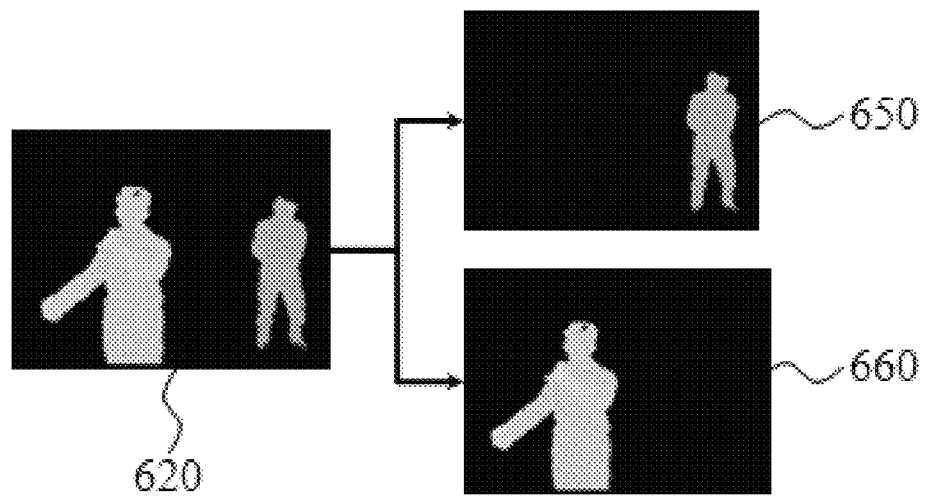

APPARATUS AND METHOD FOR DETECTING BODY PARTS FROM USER IMAGE

CROSS-REFERENCE TO RELATED APPLICATIONS

This application claims the priority benefit of Chinese Patent Application No. 201310126459.1, filed on Apr. 12, 2013, in the State Intellectual Property Office of China, and Korean Patent Application No. 10-2013-0168788, filed on Dec. 31, 2013, in the Korean Intellectual Property Office, the disclosures of which are incorporated herein by reference.

BACKGROUND

1. Field

Example embodiments relate to a computer vision technology and a mode identification technology, and more particularly, one or more example embodiments relate to an apparatus and method for detecting body parts from a captured user image.

2. Description of the Related Art

In computer vision technology, human pose estimation has uses in various fields, for example, human-computer interaction (HCI) (for example, three-dimensional (3D) interaction), smart monitoring, an animation of a realistic character in games or movies, and the like.

To estimate human body poses, human body parts may be detected. The detected body parts may be used as reference information to estimate the human body poses. In an application environment, for example a home environment, multi-user images may frequently overlap. For example, when users shake hands with each other or put their hands on each other's shoulders, corresponding user images may be connected. In another example, when users in different locations occlude each other in a depth direction, hold their arms, or hug each other, corresponding user images may overlap.

An efficiency of the detection of the body part may be limited based on the accuracy of the division of the overlapping user image into single-user images. If the user images are not divided correctly, it may be difficult to efficiently detect a body part from each of the user image. Accordingly, a body part may not be detected due to a partial damage of an image, or an error may occur in a detected body part, despite overlapping images being accurately divided into user images.

SUMMARY

The foregoing and/or other aspects are achieved by providing an apparatus configured to detect a body part from a user image, the apparatus including an image acquirer to acquire a depth image, an extractor to extract a user image from a foreground of the depth image, and a body part detector to detect a body part from the user image, using a classifier trained based on at least one of a single-user image sample and a multi-user image sample. The single-user image may be an image representing non-overlapping users, and the multi-user image may be an image representing overlapping users.

The apparatus may further include a divider to divide the user image into a single-user image and a multi-user image. The classifier may include a single-user image classifier trained based on the single-user image sample, and a multi-user image classifier trained based on the multi-user image sample. The body part detector may include a single-user image based part detector to receive the single-user image from the divider, and to detect a body part from the received single-user image using the single-user image classifier, and a multi-user image based part detector to receive the multi-user image from the divider, and to detect a body part from the received multi-user image using the multi-user image classifier.

The divider may flag each of user images extracted by the extractor from an initially acquired depth image, may track each of the flagged user images in a next acquired depth image, may determine whether the user images overlap in the next acquired depth image, and may divide each of the extracted user images into the single-user image and the multi-user image. The user images in the initially acquired depth image may not overlap each other.

In the apparatus, an upgraded classifier may be used.

The classifier may be based on a sum of multiple first features indicating an attribute of the body part and multiple second features indicating a context attribute of surroundings of the body part.

At least one of the first features and the second features may include a multi-scale ordinal pattern (MSOP) feature, and the MSOP feature may indicate a difference between depths of a plurality of rectangular areas in a depth image at a multi-scale.

The body part detector may detect the body part by performing searching based on a subwindow.

The foregoing and/or other aspects are achieved by providing a method of detecting a body part from a user image, the method including acquiring a depth image, extracting a user image from a foreground of the depth image, and detecting a body part from the user image, using a classifier trained based on at least one of a single-user image sample and a multi-user image sample. The single-user image may be an image representing non-overlapping users, and the multi-user image may be an image representing overlapping users.

The method may further include dividing the user image into a single-user image and a multi-user image. The classifier may include a single-user image classifier trained based on the single-user image sample, and a multi-user image classifier trained based on the multi-user image sample. The detecting may include receiving the single-user image into which the user image is divided, and detecting a body part from the received single-user image using the single-user image classifier, and receiving the multi-user image into which the user image is divided, and detecting a body part from the received multi-user image using the multi-user image classifier.

The dividing may include flagging each of user images extracted from an initially acquired depth image, tracking each of the flagged user images in a next acquired depth image, determining whether the user images overlap in the next acquired depth image, and dividing each of the extracted user images into the single-user image and the multi-user image. The user images in the initially acquired depth image may not overlap each other.

The detecting may include detecting the body part by performing searching based on a subwindow.

The foregoing and/or other aspects are achieved by providing an apparatus for detecting a body part from a user image, the apparatus including an image acquirer to acquire a depth image, an extractor to extract a user image from a foreground of the depth image, and a body part detector to detect a body part from the user image using a classifier trained based on at least one of a single-user image sample and a user-object image sample.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 6 illustrates a diagram of an example of dividing an extracted user image into single-user images according to example embodiments;

DETAILED DESCRIPTION

Figure 1:
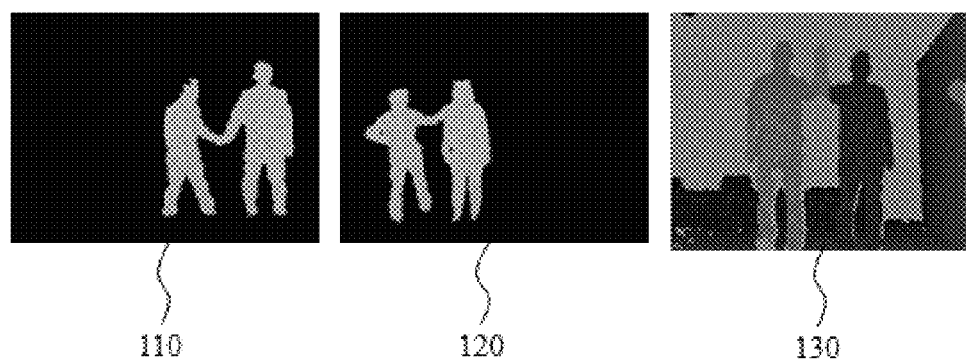
FIG. 1 illustrates a diagram of an example of division of connected images based on a typical image division processing technology according to a related art.

Example embodiments will now be described more fully with reference to the accompanying drawings, in which some example embodiments are shown. In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 illustrates a diagram of an example of division of connected images based on conventional image division processing technologies.

Referring to FIG. 1, a left image 110 of FIG. 1 may show a situation in which two users shake hands with each other, and images representing the users may be connected. A middle image 120 of FIG. 1 may show a situation in which two users touch their hands on each other's shoulders, and images representing the users may be connected. A result shown in a right image 130 of FIG. 1 may be acquired from an image sequence captured by a conventional image division processing technology. The conventional image division processing technology may not accurately divide a connected part between user images as shown in the right image 130 of FIG. 1 and accordingly, it may be difficult to efficiently detect a body part of a user, for example, an arm of the user.

Figure 2:
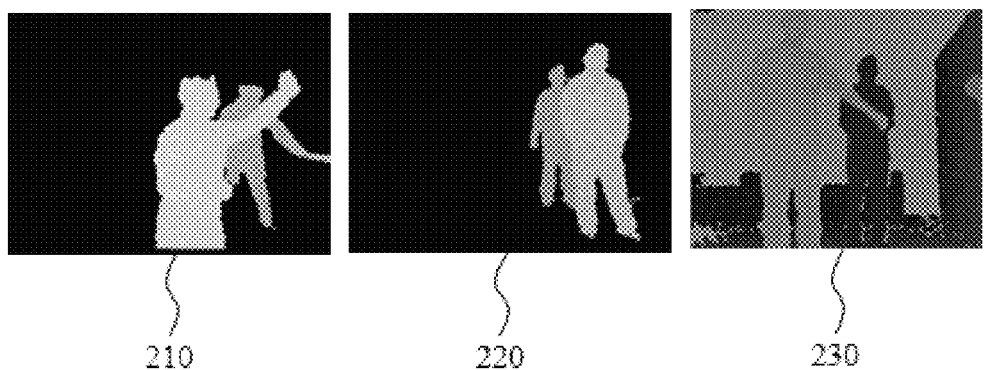
FIG. 2 illustrates a diagram of an example of division of overlapping images based on a typical image division processing technology according to a related art.

FIG. 2 illustrates a diagram of an example of division of overlapping images based on conventional image division processing technologies.

Referring to FIG. 2, two users in different locations may occlude each other in a depth direction, and may be located far away from each other. For example, as shown in a left image 210 and a middle image 220 of FIG. 2, the two users may overlap based on standing locations of the two users. A result shown in a right image 230 of FIG. 2 may be acquired from an image sequence captured by conventional image division processing technologies. Because the two users are far away from each other, as shown in the right image 230, an image representing a user near a capturing apparatus may be accurately divided using conventional image division processing technologies, however, a partial body part of the other user that is located far away from the capturing apparatus may not be accurately detected due to occlusion.

Figure 3:
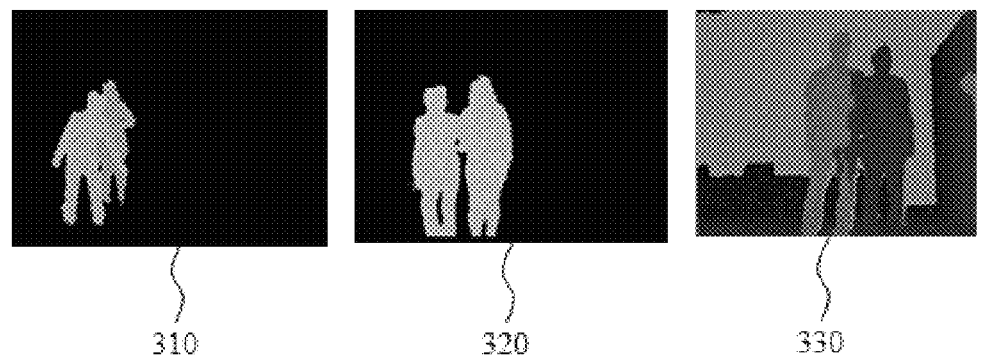
FIG. 3 illustrates a diagram of another example of division of overlapping images based on a typical image division processing technology according to a related art.

FIG. 3 illustrates a diagram of another example of division of overlapping images based on conventional image division processing technologies.

Referring to FIG. 3, two users may occlude each other in a depth direction, and may be located near to each other. For example, as shown in a left image 310 and a middle image 320 of FIG. 3, images representing the users may overlap due to standing locations of the users or holding arms. A result shown in a right image 330 of FIG. 3 may be acquired from an image sequence captured by conventional typical image division processing technologies. Because the two users are located near to each other, as shown in the right image 330, the images representing the users may not be accurately divided using the conventional image division processing technologies. For example, due to overlapping between images representing arms of the users, a body part may not be accurately detected.

As described above, conventional body part detection technology may be limited based on accuracy of image division processing for each user and accordingly, it may be difficult to acquire a desired detection result when detecting a body part from overlapping multi-user images.

Figure 4:
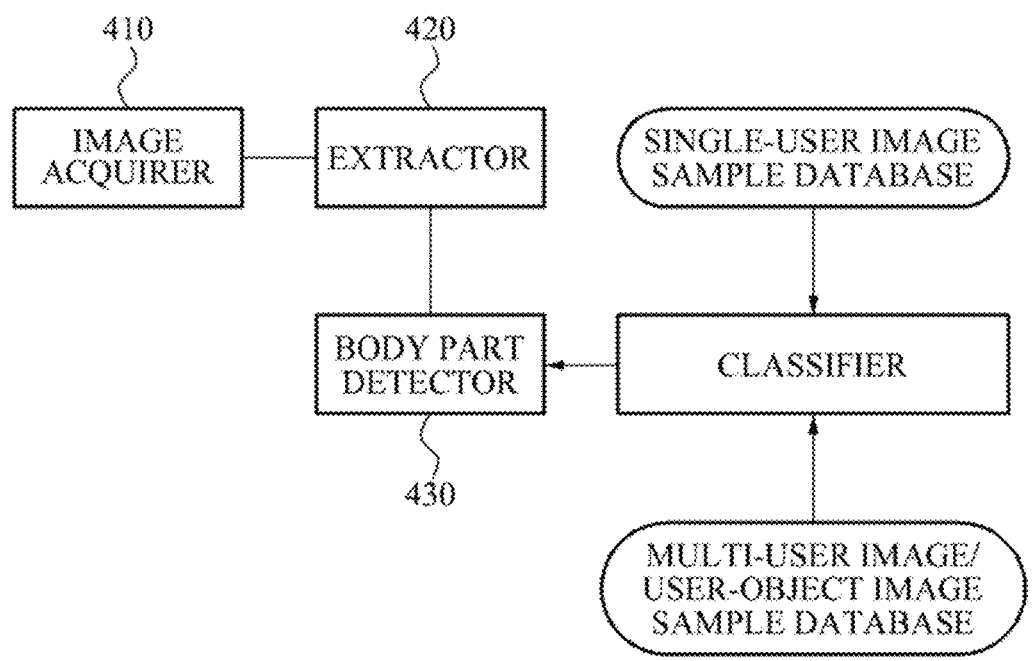
FIG. 4 illustrates a diagram of an example of an apparatus for detecting a body part from a captured user image according to example embodiments.

FIG. 4 illustrates a diagram of an example of an apparatus configured to detect a body part from a captured user image according to example embodiments.

The body part may include at least one of a head, an arm, and a leg, however, there is no limitation thereto. Accordingly, the body part may include, for example, at least one of a head, a neck, a left shoulder, a left upper arm, a left elbow, a left lower arm, a left wrist, a left hand, a right shoulder, a right upper arm, a right elbow, a right lower arm, a right wrist, a right hand, a left thigh, a left knee, a left calf, a left ankle, a left foot, a right thigh, a right knee, a right calf, a right ankle, a right foot, or the like. Further, the aforementioned body parts may be body parts of a human being or body parts of various animals. Further, the apparatus may detect the type of the body part such that different body parts may be distinguished therebetween.

Referring to FIG. 4, the body part detection apparatus may include an image acquirer 410, an extractor 420, and a body part detector 430.

The image acquirer 410 may acquire a depth image representing a captured user. For example, the image acquirer 410 may include a depth camera used to capture a depth image, and a port (not shown) used to receive a captured depth image from a capturing apparatus. The depth image may be acquired by a depth camera or a color camera (not shown). The depth camera may employ a time-of-flight (ToF) scheme or a structured light scheme (for example, a 15 Prime-Sense). However, example embodiments of a method of acquiring a depth image may not be limited thereto.

In an example embodiment, the extractor 420 may extract a user image from a foreground of the acquired depth image. In this example, the user image may include a single-user image, or a multi-user image. The single-user image may refer to an image representing non-overlapping users, and the multi-user image may refer to an image representing overlapping users. Additionally, the extractor 420 may use a scheme suitable for the acquired depth image to extract the user image from the foreground of the acquired depth image. The acquired depth image may include at least one single-user image and/or at least one multi-user image. Accordingly, the extractor 420 may extract the at least one single-user image and/or the at least one multi-user image from the acquired depth image.

In another example embodiment, the extractor 420 may extract a user image from a foreground of the acquired depth image. The user image may include a single-user image or a user-object image. The single-user image may refer to an image representing a user and an object that do not overlap, and a user-object image may refer to an image representing a user and an object that overlap each other. The user-object image may be, for example, an image showing a user holding a baseball bat. Additionally, the extractor 420 may use a scheme suitable for the acquired depth image to extract the user image from the foreground of the acquired depth image. The acquired depth image may include at least one single-user image and/or at least one user-object image. Accordingly, the extractor 420 may extract the at least one single-user image and/or the at least one user-object image from the acquired depth image.

In an example embodiment, the body part detector 430 may detect a body part from the user image, using a classifier trained based on at least one of a single-user image sample and a multi-user image sample. The single-user image sample may be stored, for example, in a single-user image sample database, and the multi-user image sample may be stored, for example, in a multi-user image sample database. Accordingly, the body part detection apparatus of FIG. 4 may not need to divide the multi-user image and thus, a detection result may not be limited based on accuracy of image division.

In another example embodiment, the body part detector 430 may detect a body part from the user image, using a classifier trained based on at least one of a single-user image sample and a user-object image sample. The user-object image sample may be stored, for example, in a user-object image sample database. Accordingly, the body part detection apparatus of FIG. 4 may not need to divide the user-object image and thus, a detection result may not be limited based on accuracy of image division.

The classifier may be, for example, an upgraded classifier $F(x)$. The upgraded classifier $F(x)$ may be based on a sum of multiple features $f_{o,t}(x)$ indicating an attribute of a detection target, for example a body part, and multiple features $f_{z,t}(x)$ indicating a context attribute of surroundings of the object.

For example, the upgraded classifier $F(x)$ may be expressed as shown in Equation 1 below.

$$F(x) = \sum_{t=1}^{T_o} f_{o,t}(x) + \sum_{t=1}^{T_s} f_{s,t}(x)$$ [Equation 1]

In Equation 1, x denotes an example for training a detection target, for example, a body part, in a sample of a classifier. The sample may be a single-user image sample, a multi-user image sample or a user-object image sample. Additionally, t denotes a sequence of the features $f_{o,t}(x)$ and $f_{s,t}(x)$, $T_o$ denotes the number of the features $f_{o,t}(x)$, and $T_s$ denotes the number of the features $f_{s,t}(x)$.

The features $f_{o,t}(x)$ and $f_{s,t}(x)$ may include a multi-scale ordinal pattern (MSOP) feature. The MSOP feature may indicate a difference between desired (or, alternatively, predetermined) attributes (for example, depths) of a plurality of rectangular areas in an image at a multi-scale. When a parameter of an MSOP (e.g., a position, a size, a type and the like) of the MSOP, is set, the features $f_{o,t}(x)$ and $f_{z,t}(x)$ may be acquired.

For example, the MSOP feature may be calculated as shown in Equation 2 below.

$$f_\theta = \sum_{i=1}^{N} b(g_i - g_c)2^i, b(g_i - g_c) = \begin{cases} 1, g_i - g_c \geq 0 \\ 0, g_i - g_c < 0 \end{cases}$$ [Equation 2]

In Equation 2, $f_\theta$ denotes the MSOP feature, and includes N rectangular areas, where N is a natural number, for example "8." $g_i$ denotes an image attribute in "i" rectangular areas, and $g_c$ denotes a reference value of an image attribute and may be expressed by $$g_c = \frac{1}{N} \sum_{i=1}^{N} g_i$$

in which θ denotes a parameter of an MSOP, for example, a position, a size, and a type of the MSOP. The features $f_{o,t}(x)$ and $f_{s,t}(x)$ may be acquired by the parameter θ.

Based on Equation 2, the classifier may calculate the MSOP feature as a numeric value, and the MSOP may be represented in the form of a sequence of binary numbers. The numeric value of the MSOP feature may indicate a difference in a desired (or, alternatively, a predetermined) attribute between a plurality of rectangular areas in an image at a multi-scale. Equations 1 and 2 are merely examples, and various features indicating a difference between a plurality of areas at a multi-scale may be applied.

The classifier may not be limited to the above-described configuration. To detect a body part of a user, all types of classifiers trained based on body parts of a single-user image sample and a multi-user image sample may be applied to the body part detector 430. Additionally, to detect a body part of a user, all types of classifiers trained based on body parts of a single-user image sample and a user-object image sample may be applied to the body part detector 430.

The classifier may include, for example, an upgraded classifier, a single-user image classifier, a multi-user image classifier, a user-object image classifier, and a user image classifier corresponding to a scheme suitable for the acquired depth image.

The body part detector 430 may detect a body part of the captured user by performing searching based on a subwindow, using the above-described classifier. For example, the body part detector 430 may set a position and a size of a subwindow, and may perform searching based on the subwindow with the set position and the set size. The body part detector 430 may determine whether the body part is included in each subwindow during the searching, using the classifier. For example, the body part detector 430 may set a parameter of each subwindow, may set five different subwindows, and may perform searching based on the set five subwindows. The parameter may include, for example, a minimum size, a maximum size, a change in size, a searching start point, a searching end point, a searching step size, and the like of the subwindow. The body part detector 430 may merge subwindows including a body part determined by the classifier, and may determine a detection result of the body part.

As described above, the body part detector 430 may detect a body part, using the classifier trained based on the single-user image sample and the multi-user image sample. Additionally, to efficiently acquire a detection result, a classifier trained based on the single-user image sample, and a classifier trained based on the multi-user image sample may be set, and a body part may be detected from the single-user image and the multi-user image.

Additionally, the body part detector 430 may detect a body part, using the classifier trained based on the single-user image sample and the user-object image sample. Additionally, to efficiently acquire a detection result, a classifier trained based on the single-user image sample, and a classifier trained based on the user-object image sample may be set, and a body part may be detected from the user-object image.

Figure 5:
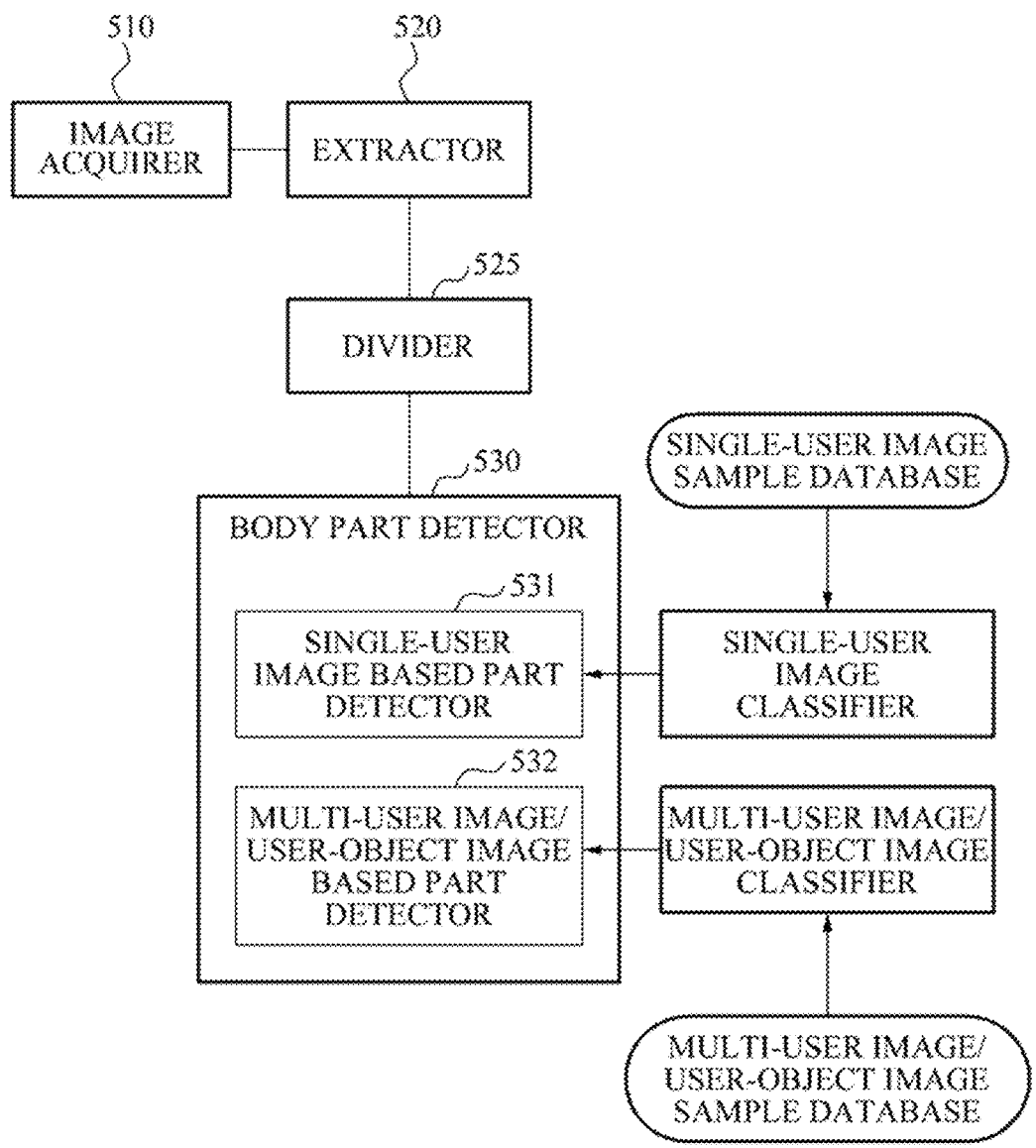
FIG. 5 illustrates a diagram of another example of an apparatus for detecting a body part from a captured user image according to example embodiments.

FIG. 5 illustrates a diagram of a body part detection apparatus according to other example embodiments.

Referring to FIG. 5, a body part detection apparatus includes an image acquirer 510, an extractor 520, a divider 525, and a body part detector 530.

The image acquirer 510 may acquire a depth image of a captured user. For example, the image acquirer 510 may include a depth camera used to capture a depth image (e.g., a 15 PrimeSense), and a port (not shown) used to receive a captured depth image from a capturing apparatus.

The extractor 520 may extract a user image from a foreground of the acquired depth image. The user image may include a single-user image, or a multi-user image. The single-user image may refer to an image representing non-overlapping users, and the multi-user image may refer to an image representing overlapping users. Additionally, the extractor 520 may extract the user image (e.g. the single-user image and/or the multi-user image) from the foreground of the acquired depth image.

When the user image is extracted from the foreground by the extractor 520, the divider 525 may divide the extracted user image into a single-user image and a multi-user image. For example, the divider 525 may flag each of user images extracted by the extractor 520 from an initially acquired depth image (for example, user images that do not overlap each other), may track each of the flagged user images in a next acquired depth image, may determine whether the flagged user images overlap each other in the next acquired depth image, and may divide each of the flagged user images into a single-user image and a multi-user image.

Figure 7:
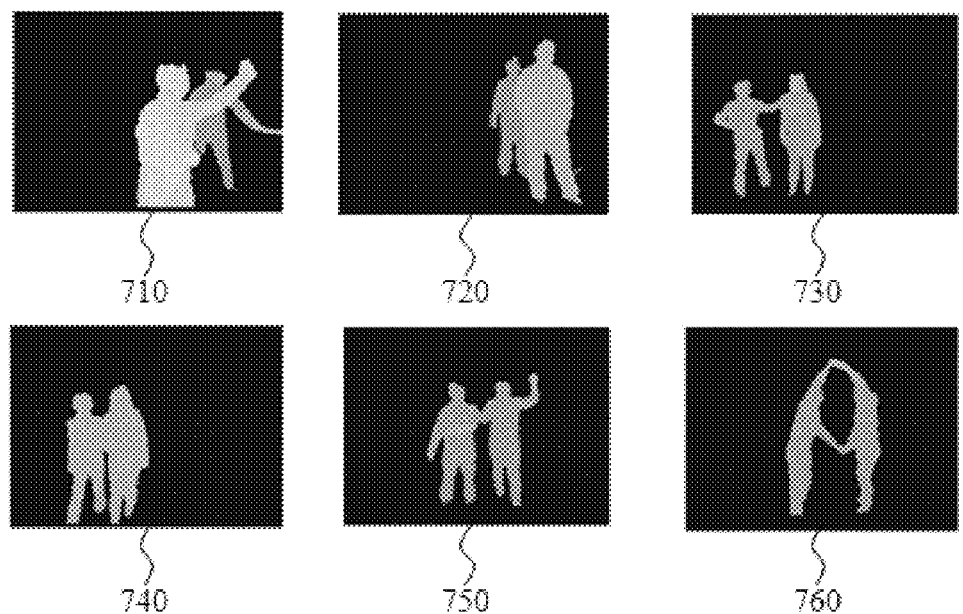
FIG. 7 illustrates a diagram of an example of multi-user images obtained by dividing according to example embodiments.

FIG. 6 illustrates an example in which the divider 525 of FIG. 5 divides an extracted user image into single-user images according to example embodiments. FIG. 7 illustrates examples of multi-user images obtained by the divider 525 according to example embodiments.

Referring to FIGS. 6 and 7, the single-user images may each refer to an image representing non-overlapping users. For example, when user images in an initially acquired depth image do not overlap each other, a foreground mask 610, 620 extracted by the extractor 520 may correspond to each of single-user images. Accordingly, the divider 525 may set the extracted foreground masks 610, 620 as each of the single-user images, and may flag each of the single-user images. When a next depth image is input, different foreground masks may overlap each other, and an overlapping portion between the foreground masks may correspond to one of the multi-user images 710 to 760. Accordingly, the divider 525 may track a change in a number of masks in the next depth image, may determine whether the flagged user images overlap, and may divide each of the flagged user images into multi-user images 630 to 660 and 710 to 760.

User Image Including Multiple Users

Referring back to FIG. 5, the body part detector 530 may receive the single-user image and the multi-user image into which the extracted user image is divided by the divider 525. The body part detector 530 may include a single-user image based part detector 531, and a multi-user image based part detector 532. The single-user image based part detector 531 may receive the single-user image from the divider 525, and may detect a body part from the received single-user image using a single-user image classifier trained based on a single-user image sample. The multi-user image based part detector 532 may receive the multi-user image from the divider 525, and may detect a body part from the received multi-user image using a multi-user image classifier trained based on a multi-user image sample.

The single-user image classifier, the multi-user image classifier, the single-user image based part detector 531, and the multi-user image based part detector 532 may be configured in the layout shown in FIG. 5, however, example embodiments are not limited thereto. For example, the single-user image classifier, the multi-user image classifier, the single-user image based part detector 531, and the multi-user image based part detector 532 may have a different scheme suitable for an acquired depth image.

As described above, an extracted user image may be divided into a single-user image and a multi-user image, a classifier and a detector corresponding to each of the single-user image and the multi-user image may be configured. Accordingly, the accuracy of the classifier may be enhanced and thus, it is possible to improve a detection result.

User Image Including a User and an Object

In another example embodiment, the extractor 520 may extract a user image from a foreground of an acquired depth image. The user image may include a single-user image, or a user-object image. The single-user image may refer to an image representing a user and an object that do not overlap, and a user-object image may refer to an image representing a user and an object that overlap each other. The user-object image may be, for example, an image showing a user holding a baseball bat.

The extractor 520 may use a scheme suitable for the acquired depth image to extract the user image from the foreground of the acquired depth image. The acquired depth image may include at least one single-user image and/or at least one user-object image. Accordingly, the extractor 520 may extract the at least one single-user image and/or the at least one user-object image from the acquired depth image.

When the user image is extracted from the foreground by the extractor 520, the divider 520 may divide the extracted user image into a single-user image and a user-object image. For example, the divider 520 may flag a user image and an object image extracted by the extractor 520 from an initially acquired depth image (for example, a user image representing a user and an object that do not overlap each other), may track the flagged user image and the flagged object image in a next acquired depth image, may determine whether the flagged user image and the flagged object image overlap each other in the next acquired depth image, and may divide the user image into a single-user image and a user-object image.

For example, when a user image and an object image in an initially acquired depth image do not overlap each other, a foreground mask extracted by the extractor may correspond to each of a single-user image and an object image. Accordingly, the divider 525 may set the extracted foreground mask as each of the single-user image and the object image, and may flag the single-user image and the object image. When a next depth image is input, different foreground masks may overlap each other, and an overlapping portion between the foreground masks may correspond to a user-object image. Accordingly, the divider 520 may track a change in a number of masks in the next depth image, may determine whether the flagged user image and the flagged object image overlap, and may divide the user image into user-object images.

The body part detector 530 may receive the single-user image and the user-object image into which the extracted user image is divided by the divider. The body part detector 530 may include the single-user image based part detector 531 and a user-object image based part detector 532. The single-user image based part detector 531 may receive the single-user image from the divider, and may detect a body part from the received single-user image using a single-user image classifier trained based on a single-user image sample. The user-object image based part detector 532 may receive the user-object image from the divider 525, and may detect a body part from the received user-object image using a user-object image classifier trained based on a user-object image sample.

The single-user image classifier, the user-object image classifier, the single-user image based part detector 531, and the user-object image based part detector 532 may be configured based on a scheme of FIG. 5, however, example embodiments are not limited thereto. For example, the single-user image classifier, the user-object image classifier, the single-user image based part detector 531, and the user-object image based part detector 531 may be installed based on a scheme suitable for an acquired depth image.

As described above, an extracted user image may be divided into a single-user image and a user-object image, a classifier and a detector 530 corresponding to each of the single-user image and the user-object image may be configured. Accordingly, accuracy of the classifier may be enhanced and thus, it is possible to improve a detection result.

Figure 8:
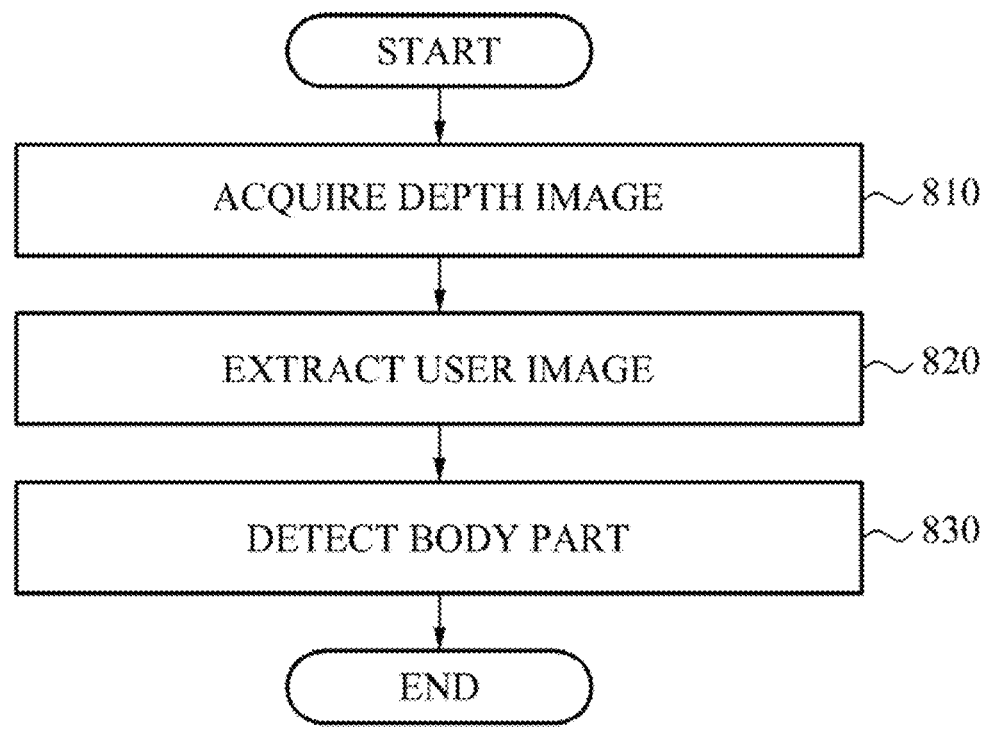
FIG. 8 illustrates a flowchart of an example of a method of detecting a body part from a captured user image according to example embodiments.
Figure 9:
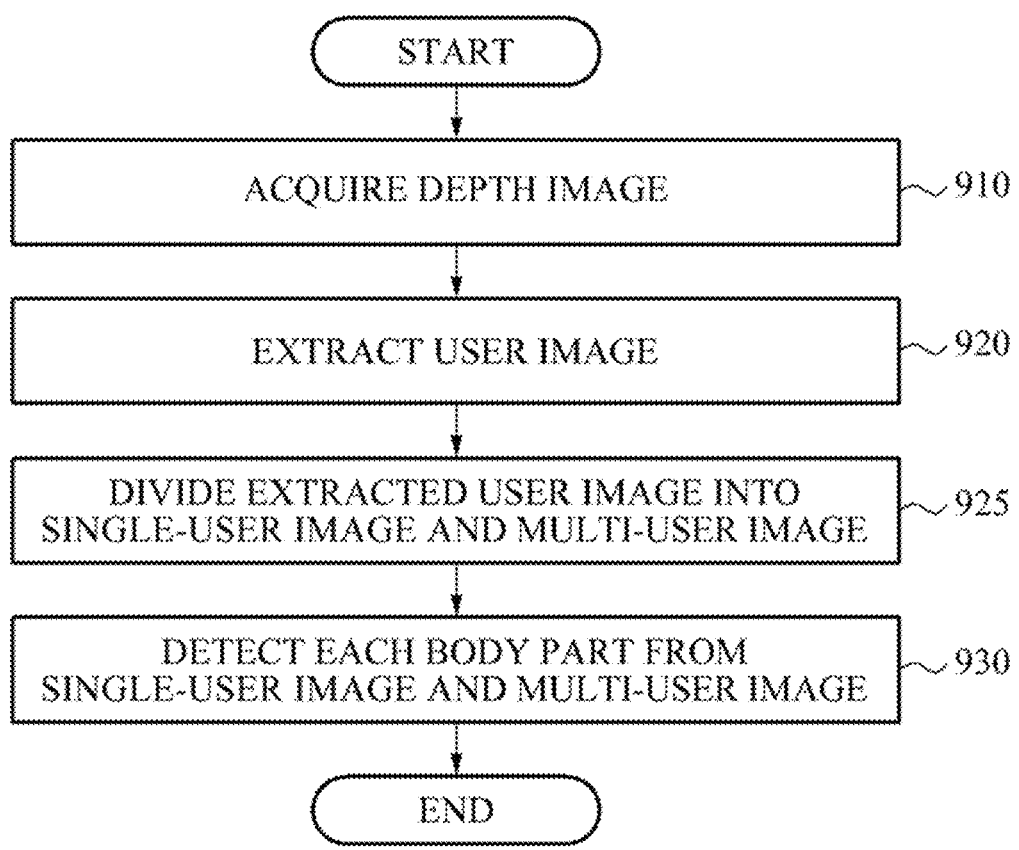
FIG. 9 illustrates a flowchart of another example of a method of detecting a body part from a captured user image according to example embodiments.

FIGS. 8 and 9 illustrate methods of detecting a body part from a captured user image according to example embodiments. The methods illustrated in FIGS. 8 and 9 may be performed by the body part detection apparatuses of FIGS. 4 and 5, however, example embodiments are not limited thereto.

FIG. 8 illustrates a flowchart of an example of a method of detecting a body part from a captured user image according to example embodiments.

Referring to FIG. 8, in operation 810, the image acquirer 410 of FIG. 4 may acquire a depth image of a user.

User Image Including Multiple Users

In operation 820, the extractor 420 of FIG. 4 may extract a user image from a foreground of the acquired depth image. The user image may include a single-user image or a multi-user image. The single-user image may refer to an image representing non-overlapping users, and the multi-user image may refer to an image representing overlapping users. The acquired depth image may include at least one single-user image and/or at least one multi-user image. Accordingly, in operation 820, the extractor 420 may extract the at least one single-user image and/or the at least one multi-user image from the acquired depth image.

In operation 830, the body part detector 430 of FIG. 4 may detect a body part from the user image, using a classifier trained based on at least one of a single-user image sample and a multi-user image sample. Accordingly, the body part detection apparatus of FIG. 4 may not need to divide the multi-user image and thus, a detection result may not be limited based on the accuracy of image division.

User Image Including a User and an Object

In another example embodiment, the user image included in the foreground of the acquired depth image may include a single-user image or a user-object image. The single-user image may refer to an image representing a user and an object that do not overlap, and a user-object image may refer to an image representing a user and an object that overlap each other. Accordingly, in operation 820, the extractor 420 may extract the at least one single-user image and/or the at least one user-object image from the acquired depth image.

The body part detector 430 may detect a body part from the user image, using a classifier trained based on at least one of a single-user image sample and a user-object image sample. Accordingly, the body part detection apparatus of FIG. 4 may not need to divide the user-object image and thus, a detection result may not be limited based on accuracy of image division.

The body part detector 430 may detect the body part of the captured user by performing searching based on a subwindow, using the above-described classifier. For example, the body part detector 430 may set a position and a size of a subwindow, and may perform searching based on the subwindow with the set position and the set size. The body part detector 430 may determine whether the body part is included in each subwindow during the searching, using the classifier. For example, the body part detector 430 may set a parameter of each subwindow and may perform searching based on the set subwindows. The parameter may include, for example, a minimum size, a maximum size, a change in size, a searching start point, a searching end point, a searching step size, and the like of the subwindow. The body part detector 430 may merge subwindows including a body part determined by the classifier, and may determine a detection result of the body part.

FIG. 9 illustrates a flowchart of another example of a method of detecting a body part from a captured user image according to example embodiments.

Referring to FIG. 9, in operation 910, the image acquirer 510 of FIG. 5 may acquire a depth image of a captured user.

User Image Including Multiple Users

In operation 920, the extractor 520 of FIG. 5 may extract a user image from a foreground of the acquired depth image, where the extracted user image may include a single-user image and/or a multi-user image. The single-user image may refer to an image representing non-overlapping users, and the multi-user image may refer to an image representing overlapping users. The acquired depth image may include at least one single-user image and/or at least one multi-user image.

In operation 925, the divider 525 of FIG. 5 may divide the extracted user image into a single-user image and a multi-user image. For example, the divider 525 may flag each of user images extracted by the extractor 520 from an initially acquired depth image, may track each of the flagged user images in a next acquired depth image, may determine whether the flagged user images overlap each other in the next acquired depth image, and may divide each of the flagged user images into a single-user image and a multi-user image. The user images in the initially acquired depth image may overlap each other.

In operation 930, the single-user image based part detector 531 of FIG. 5 may detect a body part from the received single-user image. Additionally, in operation 930, the multi-user image based part detector 532 of FIG. 5 may detect a body part from the received multi-user image. The single-user image classifier may be trained based on a single-user image sample, and the body part may be detected from the single-user image. The multi-user image classifier may be trained based on a multi-user image sample, and the body part may be detected from the multi-user image.

User Image Including a User and an Object

In another example embodiment, operation 920, the extractor 520 extracts a user image from a foreground of an acquired depth image, where the extracted user image may include a single-user image and/or a user-object image. The single-user image may refer to an image representing a user and an object that do not overlap, and a user-object image may refer to an image representing a user and an object that overlap each other. The acquired depth image may include at least one single-user image and/or at least one user-object image.

In operation 925, the divider 525 of FIG. 5 may divide the extracted user image into a single-user image and a user-object image. For example, the divider 525 may flag a user image and an object image extracted from an initially acquired depth image, may track the flagged user image and the flagged object image in a next acquired depth image, may determine whether the flagged user image and the flagged object image overlap each other in the next acquired depth image, and may divide the extracted user image into a single-user image and a user-object image. In the initially acquired depth image, the user image and the object image may not overlap each other.

In operation 930, the single-user image based part detector 531 of the body part detector 530 may receive the single-user image from the divider 525, and may detect a body part from the received single-user image using the single-user image classifier. The user-object image based part detector 532 of the body part detector 530 may receive the user-object image from the divider 525, and may detect a body part from the received user-object image using a user-object image classifier. The single-user image classifier may be trained based on a single-user image sample, and the body part may be detected from the single-user image. The user-object image classifier may be trained based on a user-object image sample, and the body part may be detected from the user-object image.

Figure 10:
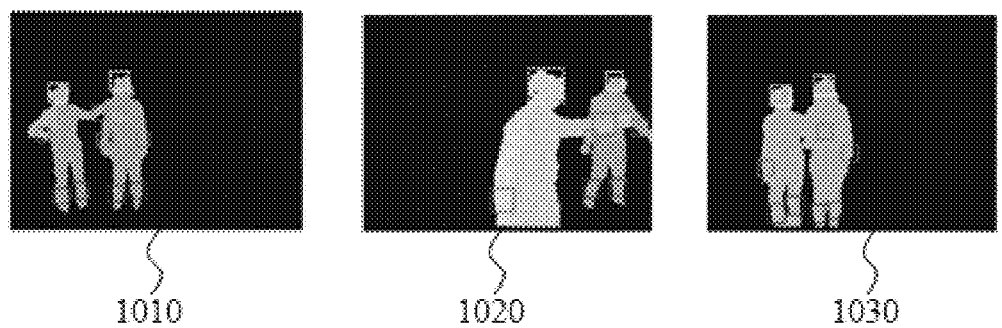
FIG. 10 illustrates a diagram of an example of a detection result of a body part according to example embodiments.

FIG. 10 illustrates a diagram of a detection result of a body part according to example embodiments.

Referring to FIG. 10, in multi-user images 1010, 1020 and 1030, body parts may be detected as illustrated by the boxes in FIG. 10. More specifically, when a single-user image classifier is trained based on a plurality of single-user image samples (e.g., 100,000 single-user image samples) and a multi-user image classifier is trained based on a plurality of multi-user image samples (e.g., 100,000 multi-user image samples), heads, arms and legs may be accurately detected from overlapping multi-user images, as shown in boxes in FIG. 10.

As described above, according to example embodiments, an apparatus and method may detect body parts from overlapping multi-user images using a classifier based on a multi-user image sample. Accordingly, it is possible to efficiently detect a body part from overlapping multi-user images. Additionally, an extracted user image may be divided into a single-user image and a multi-user image, and a classifier and a detector corresponding to each of the single-user image and the multi-user image may be configured. Accordingly, accuracy of the classifier may be enhanced and thus, it is possible to improve a detection result.

In another example, example when a single-user image classifier is trained based on a plurality of single-user image samples (e.g., 100,000 single-user image samples), and when a user-object image classifier is trained based on a plurality of user-object image samples (e.g., 100,000 user-object image samples), heads, arms and legs may be efficiently detected from overlapping user-object images.

As described above, according to example embodiments, an apparatus and method for detecting each body part from a captured user image may detect a body part from a user-object image using a classifier based on a user-object image sample. Accordingly, it is possible to efficiently detect a body part from a single-user image and overlapping user-object images. Additionally, an extracted user image may be divided into a single-user image and a user-object image, and a classifier and a detector corresponding to each of the single-user image and the user-object image may be configured. Accordingly, accuracy of the classifier may be enhanced and thus, it is possible to improve a detection result.

The apparatus and method for detecting a body part may accurately detect a body part from a multi-user image, and may not be limited based on accuracy of image division.

The units described herein may be implemented using hardware components and software components. For example, the hardware components may include microphones, amplifiers, band-pass filters, audio to digital convertors, and processing devices.

The processing devices used to implement the units described herein include one or more special purpose machines (e.g., special purpose computers), such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus configured to detect a body part from a user image, the apparatus comprising:
   an image acquirer configured to acquire a first depth image and a second depth image, the second depth image acquired after the first depth image; and
   at least one processor and a memory, the memory containing computer readable instructions stored thereon, which when executed by the at least one processor, configure the at least one processor to,
   extract the user image from a foreground of the first depth image,
   divide the user image into at least one of a single-user image representing non-overlapping users and a multi-user image representing overlapping users,
   flag the user image extracted from the first depth image,
   track the flagged user image in the second depth image,
   determine overlap of the flagged user image in the second depth image, and
   detect the body part from the extracted user image using a first classifier and a second classifier,
   wherein the first classifier is configured to classify the body part from the single-user image, and the second classifier is configured to classify the body part from the multi-user image.

2. The apparatus of claim 1, wherein
   the first classifier is trained based on at least one single-user image sample; and
   the second classifier is trained based on at least one multi-user image sample.

3. The apparatus of claim 1, wherein the first classifier and the second classifier are configured to classify the body part based on a sum of multiple first features indicating an attribute of the body part and multiple second features indicating a context attribute of surroundings of the body part.

4. The apparatus of claim 3, wherein at least one of the first features and the second features includes a multi-scale ordinal pattern (MSOP) feature, the MSOP feature indicating a difference between depths of a plurality of rectangular areas in a depth image at a multi-scale.

5. The apparatus of claim 1, wherein the at least one processor is further configured to detect the body part by performing searching based on a sub-window.

6. A method of detecting a body part from a user image, the method comprising:
acquiring a first depth image and a second depth image, the second image acquired after the first depth image;
extracting the user image from a foreground of the first depth image;
dividing the user image into at least one of a single-user image representing non-overlapping users and a multi-user image representing overlapping users;
flagging the user image extracted from the first depth image;
tracking the flagged user image in the second depth image;
determining overlapping of the flagged user image in the second depth image; and
detecting the body part from the extracted user image using a first classifier and a second classifier,
wherein the first classifier is configured to classify the body part from the single-user image, and the second classifier is configured to classify the body part from the multi-user image.

7. The method of claim 6, wherein
the first classifier is trained based on at least one single-user image sample, and
the second classifier is trained based on at least one multi-user image sample.

8. The method of claim 6, wherein the detecting comprises:
detecting the body part by performing searching based on a sub-window.

9. An apparatus for detecting a body part from a user image, the apparatus comprising:
an image acquirer configured to acquire a first depth image and a second depth image, the second depth image acquired after the first depth image; and
at least one processor and a memory, the memory containing computer readable instructions stored thereon, which when executed by the at least one processor, configure the at least one processor to,
extract the user image from a foreground of the first depth image,
divide the user image into at least one of a single-user image representing both a user and an object that does not overlap the user, and a user-object image representing both the user and the object such that the object overlaps the user,
flag the user image extracted from the first depth image,
track the flagged user image in the second depth image,
determine overlap of the flagged user image in the second depth image, and
detect the body part from the extracted user image using a first classifier and a second classifier,
wherein the first classifier is configured to classify the body part from the single-user image, and the second classifier is configured to classify a body part from the user-object image.

10. The apparatus of claim 9, wherein
the first classifier is trained based on a single-user image sample, and
the second classifier is trained based on a user-object image sample.

11. The apparatus of claim 9, wherein the first classifier and the second classifier are configured to classify areas of the user image based on a sum of multiple first features indicating an attribute of the body part and multiple second features indicating a context attribute of surroundings of the body part.

* * * * *